J. C. STEVENS.
WATER METER.
APPLICATION FILED FEB. 3, 1917. RENEWED APR. 17, 1922.

1,418,032.

Patented May 30, 1922.
2 SHEETS—SHEET 1.

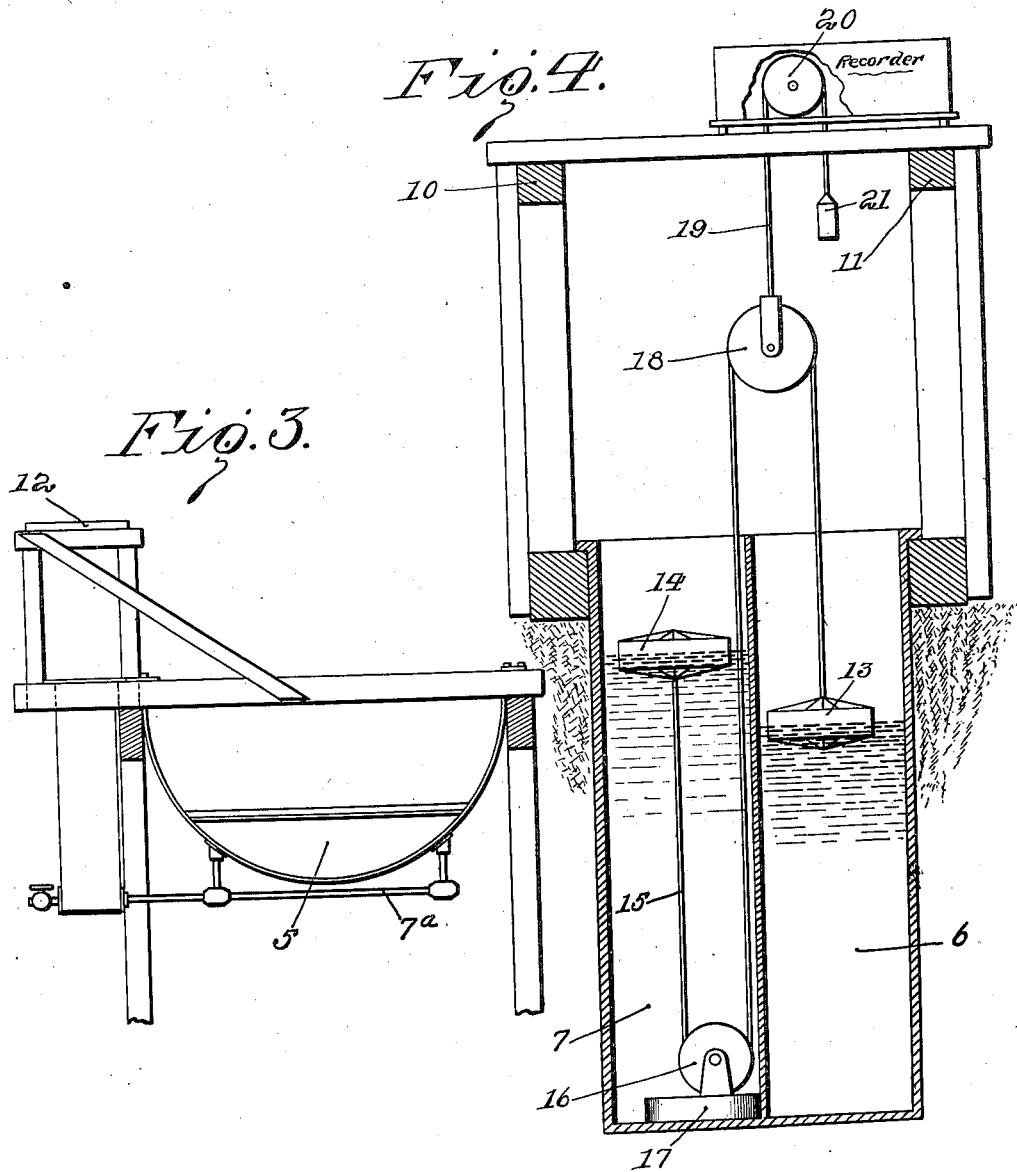

UNITED STATES PATENT OFFICE.

JOHN C. STEVENS, OF PORTLAND, OREGON, ASSIGNOR, BY MESNE ASSIGNMENTS, TO LEUPOLD, VOELPEL & COMPANY, OF PORTLAND, OREGON, A CORPORATION OF OREGON.

WATER METER.

1,418,032.    Specification of Letters Patent.    Patented May 30, 1922.

Application filed February 3, 1917, Serial No. 146,459. Renewed April 17, 1922. Serial No. 553,926.

*To all whom it may concern:*

Be it known that I, JOHN C. STEVENS, a citizen of the United States, residing at Portland, in the county of Multnomah, State of Oregon, have invented certain new and useful Improvements in Water Meters, of which the following is a description, reference being had to the accompanying drawing and to the figures of reference marked thereon.

The invention relates to new and useful improvements in water meters, and more particularly to a water meter for measuring the volume of water flowing through an open channel or flume.

An object of the invention is to provide means for measuring the volume of flow of water through an open channel or flume, which means is so constructed as to cause no appreciable loss of head in the flow.

A further object of the invention is to provide an open channel or flume with a constricted throat or passage which produces a difference in the water levels, and associating therewith means operated by the difference in water levels which indicates and records the volume of flow of the water in the channel or flume.

A still further object of the invention is to provide a water meter of the above character with floats, guide pulleys and connecting cables which are so arranged and constructed as to move the indicating or recording device in accordance with the net difference in the levels of two water surfaces.

These and other objects will in part be obvious and will in part be hereinafter more fully disclosed.

In the drawings, which show by way of illustration one embodiment of the invention:—

Fig. 3 is a sectional view on the line 3—3 of Fig. 1; and

Fig. 4 is an enlarged sectional view through the float wells which are connected to the flume or channel.

The invention is directed broadly to a water meter for measuring the volume of flow in an open channel or flume, such as used for irrigation, water power, sewage and so forth. In carrying out the invention, the open flume or channel is formed with a constricted area or throat by placing a cover over the flume or channel and depressing it so that as the water passes into the throat or constricted area its velocity is increased. Connected to the flume or channel are two wells, one of which is connected to the flume or channel just above the meter of constricted area, while the other is connected to the channel at the constricted area or throat. The difference in the water levels between the open flume just above the meter and that in the well at the throat is an index of the velocity of the water passing the throat. Associated with the wells are floats, cables and guide pulleys which operate an indicator or recording device, and these parts are so constructed and arranged that this difference in the water levels in the two wells is continually recorded on a sheet which is properly graduated to correspond to the size and type of meter, and thus a continuous record of the volume of flow is obtained.

Figure 2:
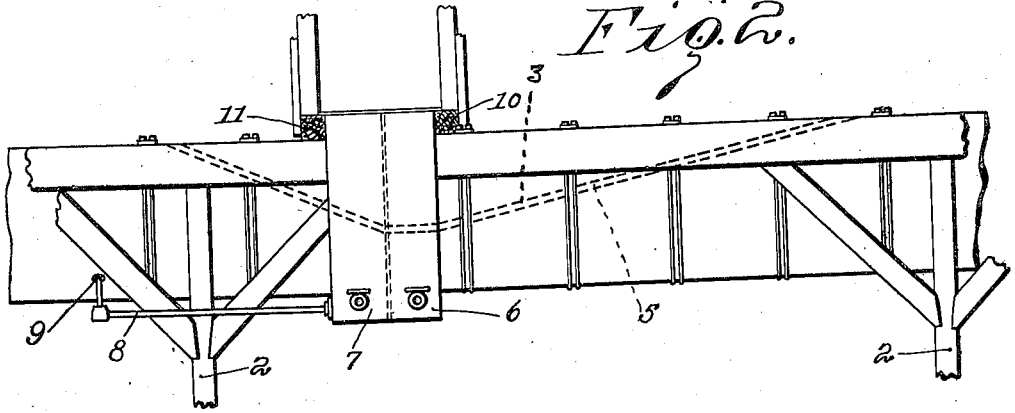
Fig. 2 is a side view of the same.

Referring more in detail to the drawings, I have indicated more or less diagrammatically a channel or flume which is formed of metal, indicated at 1, and this metal is shaped so as to provide a semi-circular metal flume or channel. The metal flume may be supported on ordinary trestles, indicated at 2—2 in the drawings, or may be buried in the ground to form in effect a lining to an earth channel. A cover 3 made of sheet metal is riveted to the angles 4 which are in turn riveted to the sides of the flume. This cover is depressed, as clearly shown in Fig. 2 of the drawings, so as to form a constricted area or throat 5 in the flume. The cross-section of this throat or constricted passage 5, in the present embodiment of the invention is a segment of a circle. The cover 3 is made so that the areas gradually decrease from the up-stream end of the cover to the throat, and increase more gradually to the down-stream end of the cover. This arrangement will reduce the total loss of head to a minimum, that is to say, the total drop in the water head in the flume or channel from the up-stream end of the meter to the down-stream end thereof is very slight.

Figure 1:
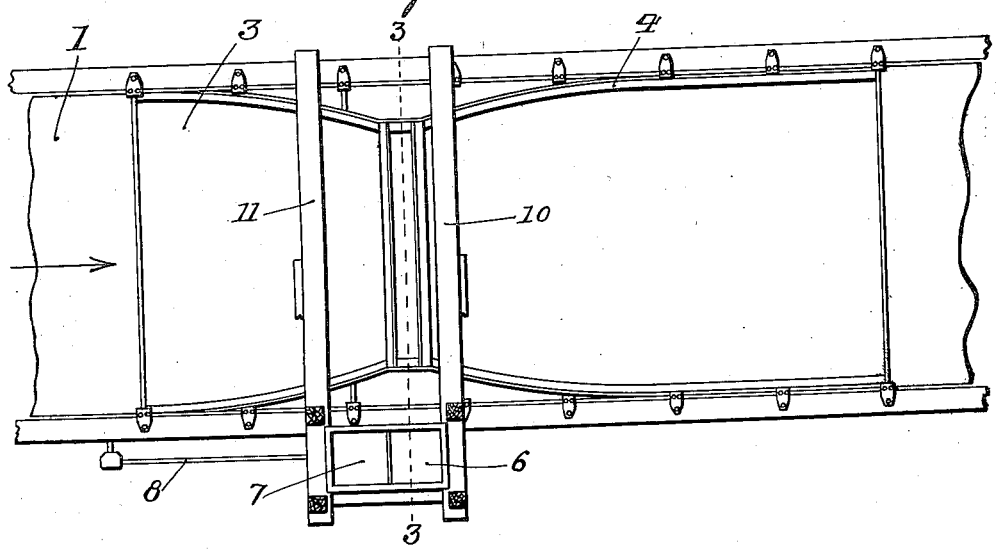
Figure 1 is a plan view of a channel or flume having my improved water meter applied thereto.

Located along side of the meter are two wells 6 and 7. The well 6 is connected by means of a pipe 7ª to the flume at the throat or constricted area therein, while the well 7 is connected by means of a pipe 8 (see Figs. 1 and 2) to the flume at a point 9 which is just above the meter. The direction of flow is indicated by the arrow in Fig. 1. The float wells 6 and 7 are suspended from cross ties 10 and 11 which also support a stand 12 for the recording device. The two float wells and the recording device are shown more or less diagrammatically in Fig. 4 of the drawings. A float 13 is located in the well 6 and rests on the surface of the water therein, while a float 14 is located in the well 7 and rests on the surface of the water in this well.

A cable 15 is connected to the float 14, and then extends about a guide pulley 16 attached to a weighted member 17 located in the well 7. This cable 15, after leaving the guide pulley 16, extends about a guide pulley 18 and is then connected to the float 13. The guide pulley 18 is carried by a cable 19 which runs over the operating wheel 20 of the recording device and the other end of this cable 19 carries a counterbalance 21.

From the above, it will be apparent that the floats 13 and 14, as they move toward a common water level, will give up slack to the cable 15, which will allow the guide pulley 18 to move upward through the action of the counterbalance 21, and this will turn the recording device. On the other hand, when the water levels in the two wells change so that the difference in the two levels increases, then the floats will move away from each other, and this will cause the guide pulley 18 to move downwardly and turn the recording device in the opposite direction. By the arrangement above described, where the cable is connected to a guide pulley at the lower part of one of the wells, the floats will measure the net difference in levels of the two water surfaces. If the float 14 remains stationary and the float 13 falls, then the difference in the levels increases and the pulley 18 moves downward one-half the amount of this increase. If the float 13 remains stationary and the float 14 falls, the difference in the levels decreases and the guide pulley 18 moves upward one-half the amount of this decrease. If both the floats rise or fall the same amount, there is no change in the difference in the levels, the pulley 18 remaining stationary and, therefore, as above noted, by my arrangement of the cables and the floats I am able to measure the net difference of the water levels in the two wells. As the pulley 18 moves only with changes in the difference in the levels, the operating wheel of the recording device will turn in direction and amount corresponding to these changes, and, therefore, the recorder will record continuously the net difference in the levels in the water surfaces in the float wells.

The volume of flow may be obtained in the well-known manner. The area of the throat or constricted passage in the meter is known, and from this together with certain constants and the "head on the meter" or the difference in the levels of the two water surfaces in the float wells, the volume of flow may be readily computed.

While I have described a flume which is semi-circular in cross section, it will be understood that the flume may be rectangular in cross section, or V-shaped in cross section, or of any desired shape, the essential features being the forming of a constricted area in an open top flume, the connecting of the water wells to the flume at the constricted area and at a point above the meter, and the utilizing of the different levels of the water in these wells for operating the recording instruments.

It is obvious that minor changes in the details of construction and the arrangement of the parts may be made without departing from the spirit of the invention, as set forth in the appended claim.

Having thus described the invention, what is claimed as new is:—

An open-channel water meter including in combination, means for forming a constricted throat for the water, two wells, one of which is connected to the channel at the constricted throat, and the other of which is connected to the channel at a point above the constricted throat, a float in each well, a guide pulley at the bottom of one of said wells, a cable connected to said floats and running over said guide pulley, a second guide pulley above the wells over which the cable runs, and means operated by said second guide pulley for indicating the volume of flow of water through the channel.

In testimony whereof, I affix my signature in the presence of two witnesses.

JOHN C. STEVENS.

Witnesses:
C. E. ELLSWORTH,
J. B. WOODWARD.